March 22, 1938. A. S. VAN HALTEREN 2,111,709
BRAKE DRUM
Filed June 4, 1936

INVENTOR.
ANDREW S. VAN HALTEREN
BY
Carroll R. Taber
ATTORNEY.

Patented Mar. 22, 1938

2,111,709

UNITED STATES PATENT OFFICE 2,111,709

BRAKE DRUM

Andrew S. Van Halteren, Lansing, Mich., assignor to Motor Wheel Corporation, Lansing, Mich., a corporation of Michigan Application June 4, 1936, Serial No. 83,429

11 Claims. (Cl. 188—218)

This invention relates to brake drums of a character including a cast metal brake ring, and more particularly to the combination with such a ring of means for reinforcing the ring to avoid breakage during assembly and use.

The advantages of cast metal as a braking surface in brake drums is well recognized. It has been common practice to provide cast metal brake rings for brake drums in order to attain these recognized advantages. Such brake rings have not been entirely satisfactory in the past because of the tendency to breakage during fabrication and use. Such breakage is due to the brittleness of the cast metal and may occur either at the time the brake drum web is attached to the ring or upon the application of severe torque load or high brake shoe pressures under usage.

The present invention has for its principal object the provision of means for overcoming both of the difficulties mentioned above. According to the present invention these difficulties are overcome by providing reinforcing means for the cast ring in the zones which are subject to breakage as just described. The reinforcing means is embedded in the brake ring itself by casting the same into the ring at the time the ring is formed.

A preferred embodiment of the invention is shown in the accompanying drawing, wherein.

Figure 2:
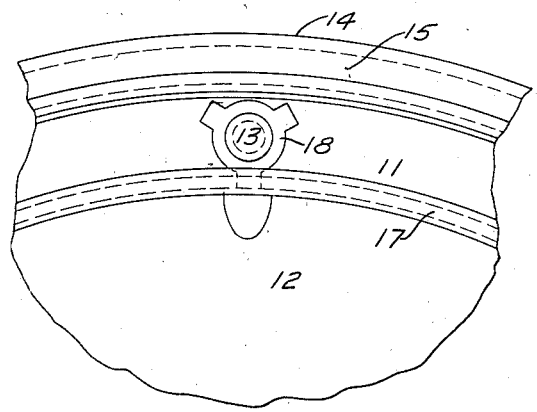
Figure 2 is a fragmentary side view in elevation of the drum shown in Figure 1.
Figure 1:
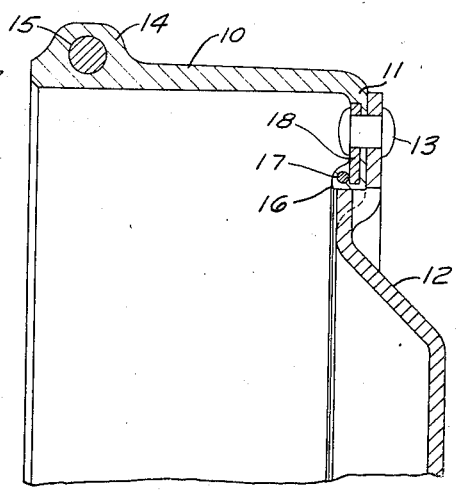
Figure 1 is a fragmentary cross-sectional view of a brake drum.

The brake drum shown in Figure 1 includes a cast metal brake ring 10 having a radially extending flange 11 at one edge thereof, a supporting web 12, and rivets 13 by means of which the flange 11 is secured to the web 12. The ring 10 is provided with a thickened portion 14 adjacent the open edge thereof. Within this thickened portion there is cast a metal reinforcing element in the form of a continuous wire or rod 15. The reinforcing element 15 is embedded in the metal of ring 10 whereby the metal of the ring completely surrounds the reinforcing element.

The flange 11 also includes a thickened edge portion 16 at the radially inner edge thereof. A reinforcing element in the form of a continuous metal ring or rod 17 is cast into the thickened portion 16. As in the case of the reinforcing element 15, the element 17 is completely surrounded by the metal of the flange 11.

Figure 4:
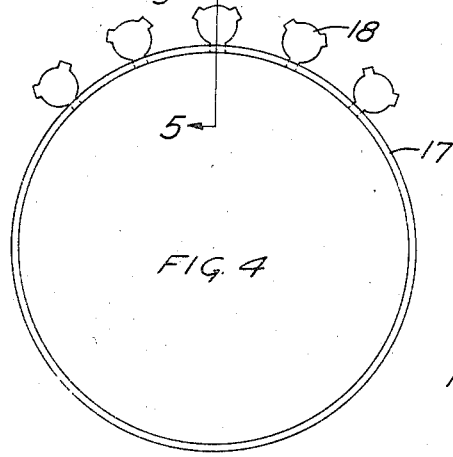
Figure 4 is a diagrammatic view of the reinforcing means including an annular reinforcing element and a plurality of reinforcing inserts.
Figure 5:
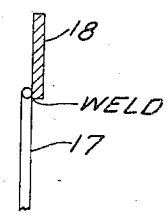
Figure 5 is a fragmentary sectional view taken on the line 5—5 of Figure 4.
Figure 6:
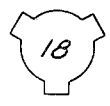
Figure 6 is a side view of one of the reinforcing inserts shown in Figure 5.
Figure 7:
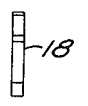
Figure 7 is an edge view of the reinforcing insert shown in Figure 6.

There is also cast into the flange 11 a plurality of circumferentially spaced apart reinforcing inserts 18 formed of ductile material. In order to properly space the inserts 18 during the casting of the ring they are preferably spot welded to the reinforcing element 17, as indicated in Figures 4 and 5. While the reinforcing inserts 18 are not completely surrounded by the metal of flange 11, the metal of the flange does extend on all sides of these inserts whereby the inserts are securely embedded in the flange.

As previously mentioned, the web 12 is attached to the ring flange 11 by means of rivets 13. The reinforcing inserts 18 are of such size, shape and spacing that each of the rivets 13 extends through one of the inserts 18, as clearly shown in Figure 1.

The annular reinforcing elements 15 and 17 serve to prevent breakage of the ring 10 during use on a vehicle, as when the ring is subjected to high brake shoe pressures or the high torque loads developed by fast stops at high speeds. Of course, the greater portion of the strain on the ring under these conditions is at the open edge thereof, and accordingly the reinforcing element 15 is a more important factor in preventing breakage than the reinforcing element 17.

The inserts 18 serve to reinforce the flange 11 during the riveting operation by means of which the ring flange is attached to the web 12 by the rivets 13. The reinforcing element 17 also serves to strengthen the flange 11 during the riveting operations. In other words, the inserts 18 and element 17 relieve the casting from the strains that are unavoidably set up when the rivet 13 is headed up either by a series of blows with hammers or by a single blow that is used when the riveting is done by a punch press.

Figure 3:
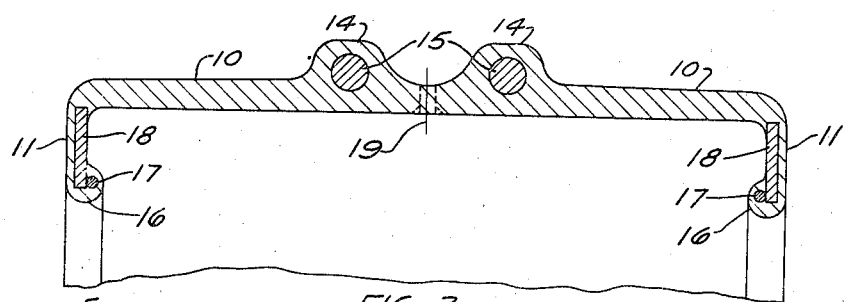
Figure 3 is a sectional view of a pair of brake rings illustrating how two rings may be formed simultaneously.

As illustrated in Figure 3, the ring 10 may be cast in pairs in a single mold and subsequently cut along the line 19 to provide two rings like that shown in Figure 1. This method of producing the ring substantially reduces the cost of manufacture.

While only the preferred embodiment of the invention has been herein shown and described, it should be understood that the invention is not limited thereto, but is co-extensive with the scope of the appended claims.

I claim:

1. A brake drum comprising a cylindrical metal ring having a continuous annular thickened portion adjacent one edge thereof and an annular reinforcing element embedded in said thickened portion with the metal of the ring completely surrounding and concealing the reinforcing element.

2. A brake drum comprising a metal brake ring and reinforcing means therefor including an annular reinforcing element having a plurality of circumferentially spaced apart reinforcing inserts attached thereto, said reinforcing means being embedded in the brake ring with the metal of the ring completely surrounding the annular reinforcing element and extending on all sides of the inserts.

3. A brake drum comprising a cast metal brake ring, a plurality of metal inserts cast into the ring, an annular wire cast into the ring in contact with the said inserts, a supporting web for the ring, and means associated with said inserts for securing the ring to the web.

4. A brake drum comprising a cast metal brake ring, a plurality of metal inserts cast into the ring, an annular wire cast into the ring in contact with the said inserts, and a supporting web for the ring, the web being secured to the ring by rivets extending through said inserts.

5. A brake drum comprising a metal brake ring having a radial flange at one edge thereof, reinforcing means embedded in said flange, said means including a plurality of circumferentially spaced apart metal inserts secured to an annular reinforcing element, and a supporting web for the ring secured to the ring by means associated with said inserts.

6. A brake drum comprising a cast metal brake ring having a radially extending flange at one edge thereof, reinforcing means including a plurality of metallic reinforcing inserts secured to an annular reinforcing element in circumferentially spaced relation cast into said flange, and a supporting web for the ring, the web being secured to the ring by means associated with said inserts.

7. In a brake drum including a radially extending attaching flange, means for reinforcing said flange comprising a plurality of separate inserts embedded in the flange and a continuous wire ring also embedded in said flange and arranged in contact with said inserts.

8. A brake drum comprising a metal ring having annular thickened portions at its edges and an annular reinforcing element embedded in each of said thickened portions with the metal of the ring completely surrounding and concealing said reinforcing element.

9. A brake drum comprising a metal ring having thickened portions adjacent its edges, an annular reinforcing element embedded in each of said thickened portions with the metal of the ring completely surrounding said reinforcing element, and a plurality of metal inserts also embedded within the metal of the ring adjacent one of said reinforcing elements.

10. A brake drum comprising a metallic ring having a thickened portion adjacent one edge thereof, an annular reinforcing element embedded in said thickened portion, a plurality of circumferentially spaced apart metal inserts also embedded in the metal of the ring, and a web for supporting the ring, the web being secured to the ring by securing means extending through the web and said inserts.

11. A brake drum comprising a metallic ring having a radially extending flange on one edge thereof, the radially inner edge of said flange being thickened, an annular reinforcing element embedded in the thickened edge portion with the metal of the ring surrounding the reinforcing element, a plurality of reinforcing inserts embedded in the flange, each of said reinforcing inserts being of irregular shape and having a projecting portion arranged adjacent said reinforcing element, a web for supporting the ring, the web being secured to the ring by securing means extending through said inserts.

ANDREW S. VAN HALTEREN.